(12) United States Patent
Wang

(10) Patent No.: US 6,907,959 B2
(45) Date of Patent: Jun. 21, 2005

(54) ELECTRIC BRAKE ACTUATING ASSEMBLY AND ACTUATOR

(75) Inventor: Nui Wang, Victoria (AU)

(73) Assignee: PBR Australia Pty Ltd (AU)

( * ) Notice: Subject to any disclaimer, the term of this patent is extended or adjusted under 35 U.S.C. 154(b) by 0 days.

(21) Appl. No.: 10/756,836

(22) Filed: Jan. 13, 2004

(65) Prior Publication Data

US 2004/0163896 A1 Aug. 26, 2004

Related U.S. Application Data

(63) Continuation of application No. PCT/AU02/00955, filed on Jul. 16, 2002.

(30) Foreign Application Priority Data

Jul. 16, 2001 (AU) ............................................. PR6360
Feb. 14, 2002 (AU) ............................................. PS0544

(51) Int. Cl.[7] ................................................. B62L 3/00
(52) U.S. Cl. ......................... 188/2 D; 188/156; 188/157
(58) Field of Search ................................. 188/2 D, 156, 188/157

(56) References Cited

U.S. PATENT DOCUMENTS

| | | | | |
|---|---|---|---|---|
| 1,666,390 A | * | 4/1928 | Marley | ........................ 188/194 |
| 4,776,543 A | * | 10/1988 | Stableford | ................... 244/232 |
| 4,795,002 A | * | 1/1989 | Burgei et al. | ................ 188/2 D |
| 4,817,463 A | * | 4/1989 | Cameron | ..................... 475/154 |
| 5,131,288 A | * | 7/1992 | Barlas | .......................... 74/512 |
| 5,690,193 A | * | 11/1997 | Baumann et al. | .......... 188/72.9 |
| 2003/0070885 A1 | * | 4/2003 | Tachiiri et al. | ............. 188/2 D |

FOREIGN PATENT DOCUMENTS

| | | | | |
|---|---|---|---|---|
| DE | 3904460 A1 | 8/1990 | | |
| EP | 936112 A1 | 8/1999 | | |
| FR | 2760711 A1 | 9/1998 | | |
| WO | WO 90/015743 A2 | * | 12/1990 | ........... B60T/13/74 |

* cited by examiner

*Primary Examiner*—Robert A. Siconolfi
(74) *Attorney, Agent, or Firm*—Hahn Loeser & Parks LLP; Michael H. Minns

(57) ABSTRACT

An electric brake actuator (14), including a rotatable member (21) and electric drive means (34) for driving the rotatable member (21) to rotate. The rotatable member (21) is arranged for engagement with a continuous cable (18) that in use extends between and in connection with a pair of brake assemblies (12) that are operable when actuated to apply a braking load to brake a wheel associated with each respective brake assembly. The rotatable member (21) is arranged such that it is operable to pull the cable (18) on each side of the rotatable member (21) upon rotation of the rotatable member (21) in a first direction, for actuation of the brake assemblies (12), and to extend the cable (18) on each side of the rotatable member (21) upon rotation of the rotatable member (21) in a second and reverse direction.

36 Claims, 8 Drawing Sheets

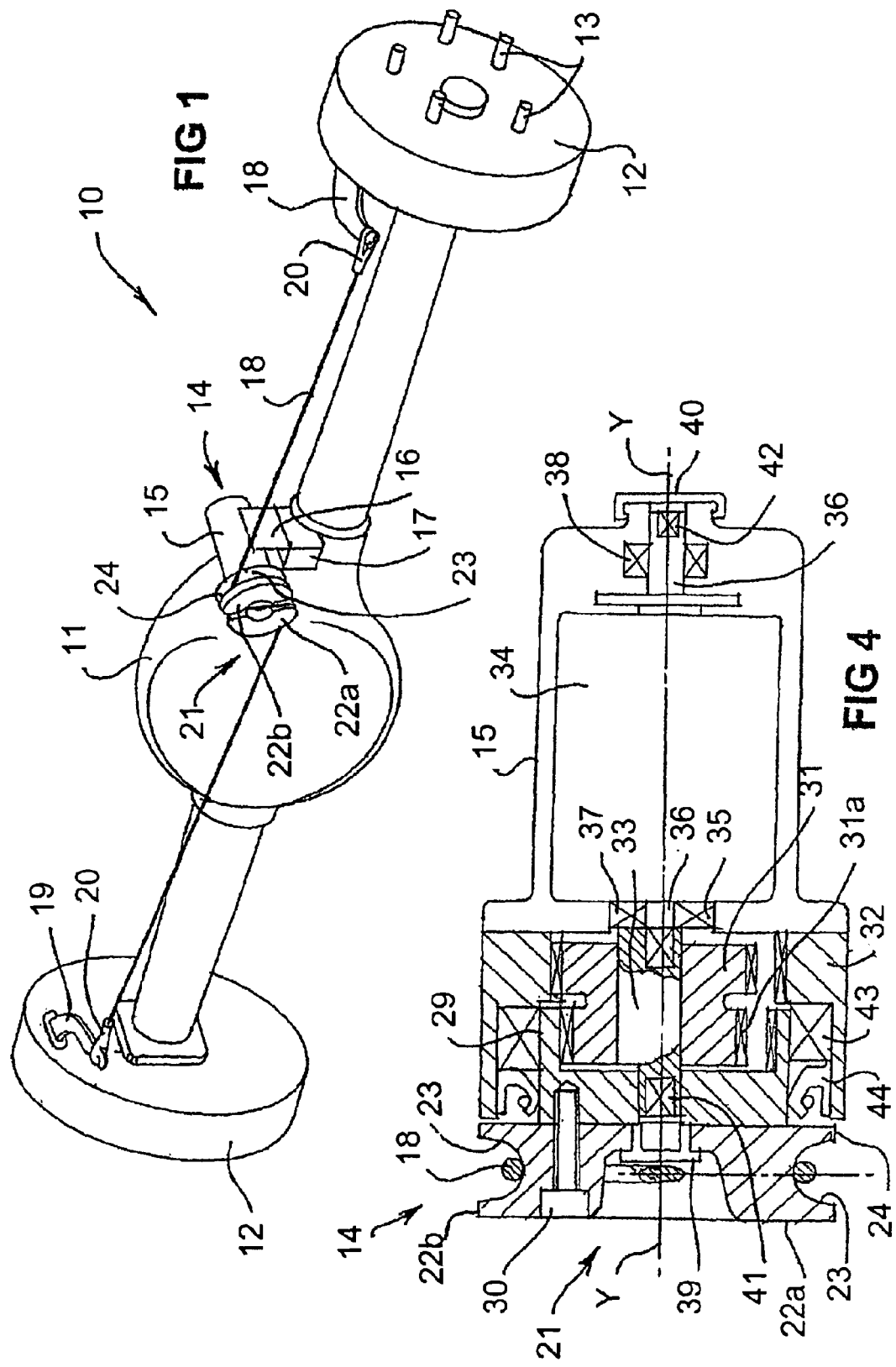

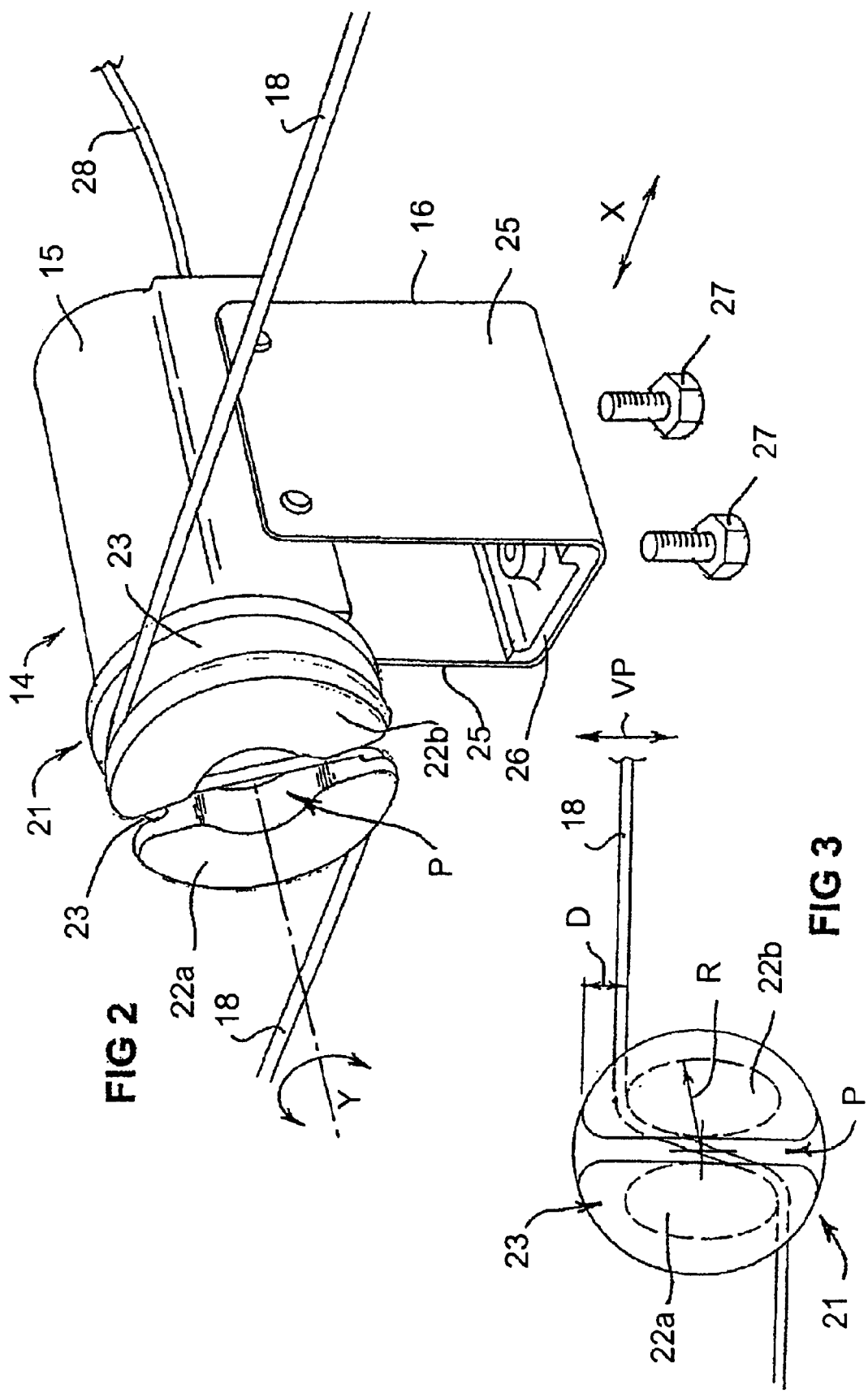

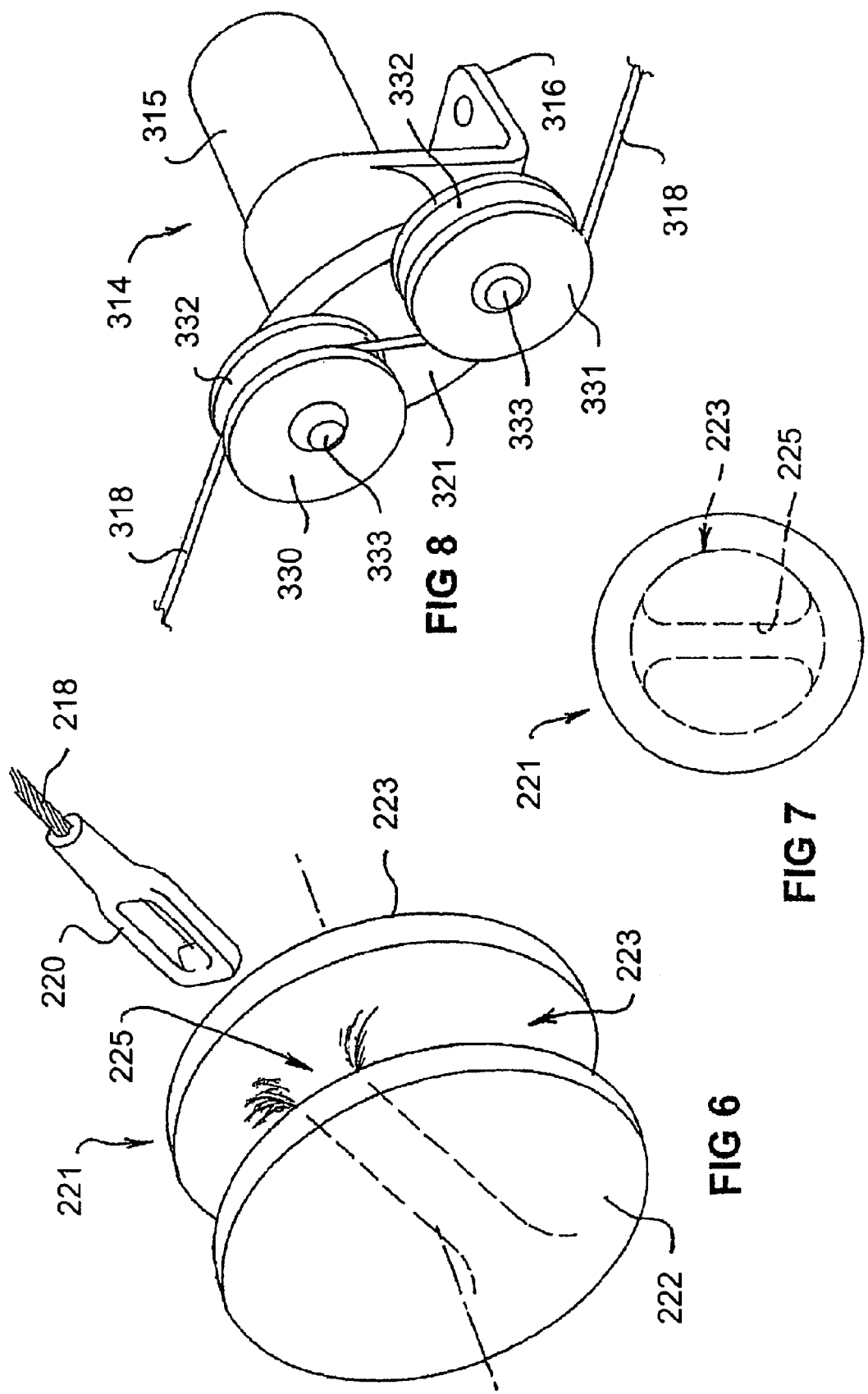

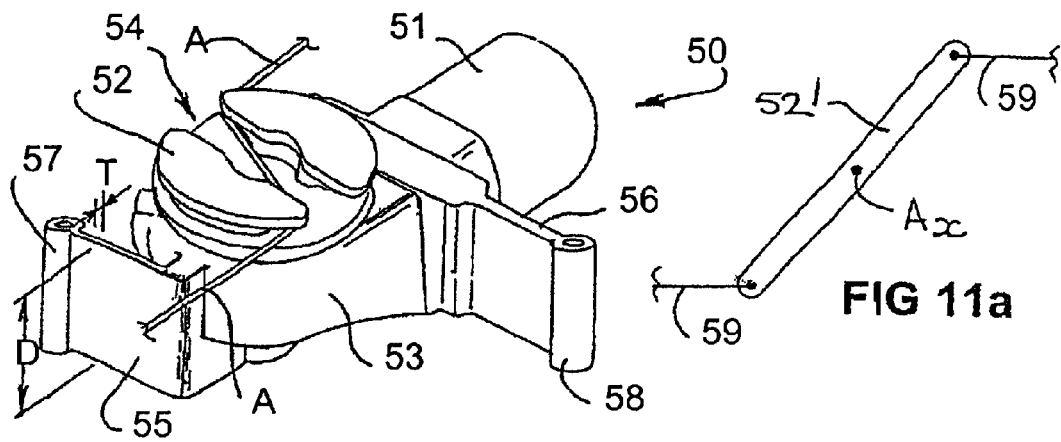
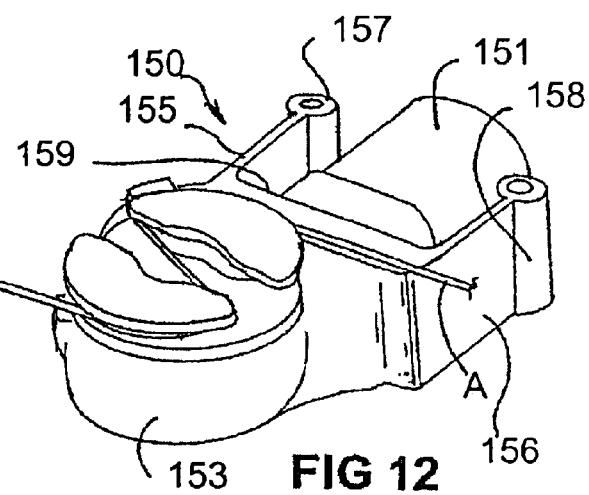
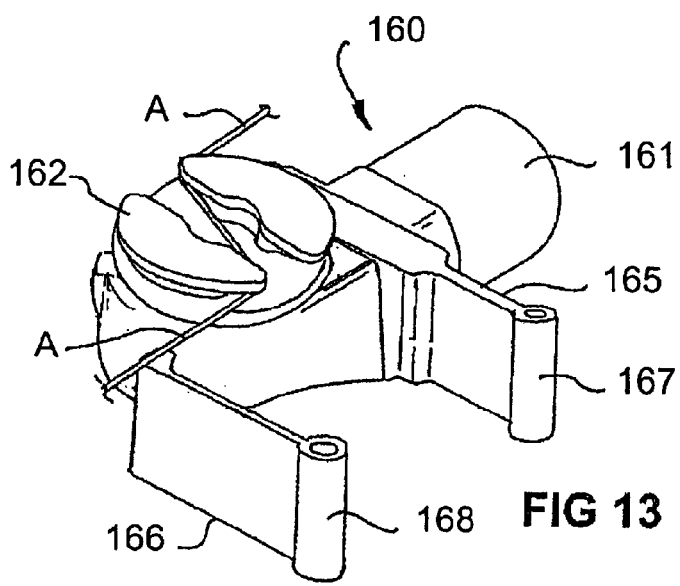

ELECTRIC BRAKE ACTUATING ASSEMBLY AND ACTUATOR

This application is a continuation of International application PCT/AU02/00955 filed on Jul. 16, 2002, the disclosure of which is hereby incorporated by reference.

BACKGROUND OF THE INVENTION

The present invention relates to an electric brake actuating assembly and an electric brake actuator for actuating brakes of an automotive vehicle. It will be convenient to describe the invention as it relates to the actuation of the parking brake of a vehicle, but it is to be appreciated that the actual type of brake the invention is suitable for can be brakes other than a parking brake and could, for example, be a service brake of the drum or disc kind.

Electric brake actuators have been considered in recent times as being attractive for parking brake actuation, by facilitating removal of the need for manual parking brake actuation by the vehicle driver and by providing greater control of the braking load which is applied. As yet however, an electric parking brake assembly and actuator that is generally acceptable to the automotive industry has not been provided.

SUMMARY OF THE INVENTION

It is an object of the present invention to provide an electric parking brake actuator for use in the automobile industry and which meets with general acceptance in that industry.

The invention can be provided by an electric brake actuator that includes a rotatable member and electric drive means for driving the rotatable member. The rotatable member can be arranged for engagement with a single cable that extends into engagement with a brake assembly and the rotatable member is operable to retract the cable in a first direction of rotation and to extend the cable in a second direction of rotation.

The cable retraction facilitates actuation of the brake assembly while cable extension facilitates release of the brake assembly.

A vehicle is normally provided with brake assemblies associated with each of the four wheels thereof. Typically, two of those assemblies (normally those associated with the rear wheels) include parking brake assemblies.

Accordingly, two or more of the above forms of electric brake can be provided, with each being operable in relation to a separate brake assembly. Thus, in one arrangement, a pair of electric brake actuators is provided to actuate each of the two parking brake assemblies on the rear wheels of a vehicle.

In this form of the invention, the rotatable member may take any suitable form, such as a drum winder or wheel. The rotatable member will include means to properly engage the cable for retraction and extension, such as by connection of a cylindrical ferrule secured to one end of the cable which can be securely fixed into a pocket or recess formed in the rotatable member. Other suitable arrangements are equally possible.

Operation of the actuator may be controlled by suitable control means, such as a computer control which determines the braking load required to be applied by the or each braking assembly and causes the rotatable member to be rotated an amount that retracts the cable sufficiently to apply that load.

Where more than one electric brake actuator is employed, the control means may control them as a group, making suitable adjustments as necessary for brake lining wear, cable stretch and other characteristics that may differ between the various actuators, cables and brake assemblies.

According to another aspect of the present invention, there is provided an electric brake actuator including a rotatable member and electric drive means for driving said rotatable member, said rotatable member being arranged for engagement with a continuous cable that extends between and in operative engagement with a pair of brake assemblies that are operable when actuated to apply a braking load to brake a wheel associated with each respective said brake assembly, said rotatable member being arranged such that it is operable to retract said cable on each side of said rotatable member upon rotation of said rotatable member in a first direction, and to extend said cable on each side of said rotatable member upon rotation of said rotatable member in a second and reverse direction.

The present invention also provides an electric brake actuating assembly, which includes an electric brake actuator according to the above aspect of the invention, which actuating assembly is operable for actuation of a pair of brake assemblies employed in a vehicle. The actuating assembly includes a cable extending between and in engagement with said brake assemblies. The electric actuator is disposed between the brake assemblies with the rotatable member thereof in engagement with the cable. The electric actuator is operable to rotate the rotatable member in a first direction in order to retract the cable extending on either side thereof, and thereby actuate each of the brake assemblies to each apply a braking load, and in a second and reverse direction of rotation, to extend the cable on either side thereof to release the braking load applied by each of the brake assemblies.

The rotatable member can take any suitable form and in one form, it includes a pair of spaced apart bearing surfaces, against which the cable bears and which are positioned so that the cable can extend from one bearing surface to the other and away from each of the bearing surfaces, for extension from opposite sides of the rotatable member to a respective brake assembly. The reaction forces between the respective bearing surfaces and the cable preferably are opposite, or at least include an opposite component for retracting the cable disposed on opposite sides of the rotatable member in opposite directions upon rotation of the rotatable member in the first direction.

In one form of the invention, the bearing surfaces are disposed on opposite sides of the axis of rotation of the rotatable member and preferably are spaced an equal distance away from that axis. The bearing surfaces preferably are curved and in one embodiment, they curve at a constant and preferably equal radius. In this arrangement, when the rotatable member is rotated, the cable on each side of the actuator does not shift radially relative to the axis of rotation. This is an advantage, because it is easier to control the angular rotation of a drive motor (constituting the electric drive means) to apply a given load or displacement to the cable (either in a relaxed or actuating condition) when cable displacement produced by constant radius bearing surfaces is linearly related to the angular rotation of the drive shaft of the motor. The control means employed to control the cable displacement imparted to the cable by the drive motor preferably is an encoder which is attached to the motor shaft.

It is still possible to provide suitable control if the bearing surfaces are other than of constant radius, however a constant radius reduces the number of variables a control or feedback system must accommodate when analyzing the signals received from the brake assembly.

The bearing surfaces are configured in order to change the direction of the cable in the section of the cable that engages the respective bearing surface. The shape or profile of the bearing surfaces is therefore limited to such shapes or profiles that do not damage the cable being employed. Thus, for example, the radius of any curved section (if any) of the bearing surfaces must be greater than that which would cause a permanent deformation, such as a kink, in the cable.

In one form of the invention, the rotatable member is formed as a circular disc with a cable groove formed in the peripheral edge of the disc and with a passage formed through the disc, preferably diametrically through the axis of the disc, which opens at either end into the base of the groove. In this form of the invention, the passage may be formed as a bore through the rotatable member, or it may be an open passage between or separating two sections or lobes of the rotatable member. In each of these forms of the passage, the bearing surface can include a shoulder of each end of the passage at the opening to the groove, on opposite sides of the passage and can additionally include the surface of the groove. In each case, the cable will extend from the passage at either end into the groove. The groove preferably has a depth about equal to twice the diameter of the cable.

In a further form of the invention, the rotatable member includes a pair of rollers rotatably mounted on spindles extending from a back plate. The rollers are disposed in the same plane or substantially the same plane and rotate about spaced apart parallel axes. The axes are preferably disposed equidistantly on opposite sides of the axis of rotation of the back plate. Each of the rollers is formed with a groove to accommodate the cable and the cable extends between the rollers and away from the actuator to separate brake assemblies. The rollers eliminate sliding movement between the cable and the rotatable member, which may occur through uneven stretching of the cable, or from uneven loading applied to the cable. In the earlier embodiments, the cable will normally be able to slide relative to the rotatable member until such time as the friction load between the cable and the rotatable member exceeds the load causing the relative sliding. However, in this form of the invention, such frictional resistance advantageously is substantially eliminated, so that the relative movement can continue until the cable loading is even throughout the cable.

In the above forms of the invention, the rotatable member can be of a two dimensional form, such that the cable extends about or through the member in a single plane. The invention could however, also be applied in a three dimensional form to increase the surface area of the rotatable member for bearing engagement with the cable. In one arrangement, the rotatable member is part three dimensional curvilinear, such as part spherical or ellipsoid and includes a bearing surface, such as cable groove, formed on the three dimensional surface. The advantage of such an arrangement is that the cable can be routed over the three dimensional face of the rotatable member, so that the routing can be over a greater area and therefore, be more gentle than might be available in a two dimensional rotatable member.

For example, in the above described embodiment, in which the cable bearing surface includes a shoulder defined between the cable groove and cable passage, the cable can undergo a change in direction of up to about 80 over a short length of bearing surface. The cable must therefore have sufficient flexibility and resistance to permanent distortion, to accommodate such an abrupt directional change. A less aggressive change in cable direction can be adopted, but that can have a consequent effect requiring the size of the rotatable member to be greater than otherwise. The trade-off affects the torque requirement of the actuator, so affecting the specification of the motor and, if provided the gearbox. Accordingly, the greater the diameter of the rotatable member, the greater the torque required, and greater torque generally increases the cost of the motor and the gearbox. A greater length of cable also is required. The trade-off can also affect the expense of the cable employed with the actuator, as it typically would be the case that the expense of the cable increases as the directional change the cable undergoes also increases. A three dimensional rotatable member advantageously can lengthen the surface over which the change in cable direction occurs.

In one form, the rotatable member has a cable groove arrangement, comprising a first annular groove and a second groove which intersects with the first groove in at least one, but preferably two positions. In this arrangement, the second groove extends in a three dimensional path, preferably between opposite intersection points with the first groove. In one arrangement, the second groove comprises a pair of joined, relatively reverse curving portions, which preferably are each semi-circular in lengthwise shape. In this arrangement, the inside wall of each of the second groove portions forms a bearing surface against which the cable bears. To ensure that the cable is maintained within the second groove when the rotatable member is operatively installed in an actuator in a vehicle, the respective bearing surfaces can define a lip or the like which captures the cable against release from the groove when the cable is under tension, in an operative condition of the actuator. That operative condition includes both the condition when the brakes are applied and when the brakes are released, because in each condition, the cable is in tension. The lip would be arranged so that the cable could be released from the groove, or inserted into the groove, when the actuator is in an inoperative condition, say when the actuator is being installed or removed from a vehicle, or when brake maintenance is being undertaken.

A cable groove arrangement described above can vary and in one form, it may comprise only the second groove. Alternatively, a first groove may be provided, but in the form of a pair of part annular groove sections. In this arrangement, the first groove may only be required at each intersection point with the second groove, so that a complete annular groove may not be required.

The three dimensional shape of the actuator may comprise a part sphere, such as a hemi-sphere, or either a major sphere part (more than a hemi-sphere) or a minor sphere part (less than a hemi-sphere). Alternatively, it may be part ellipsoid, or it may be otherwise shaped as required.

The electric drive means can take any suitable form, although an electric motor of compact form is preferred. In the preferred arrangement, the electric motor is coupled directly to the rotatable member, or is coupled indirectly through a geared arrangement. This latter arrangement is likely to be generally required, in order to reduce the rotational speed of the electric motor and to achieve the torque necessary to apply a braking load.

The cable is a continuous cable, which means it is a single length of cable which extends between the brake assemblies. The actuator is arranged to cooperate with the cable between the brake assemblies, without disturbing the continuous nature of the cable. It is the case that the path of the cable will be altered through engagement with the rotatable member, but it will extend in a continuous manner through the rotatable member. The cable can be of any suitable grade, such as that which is sometimes used presently for parking brake actuation, although if the actuator is to be employed for service brake operation, then a cable of heavier grade or greater tensile strength may be necessary.

The cable preferably extends from the rotatable member in each of two substantially opposed directions. In one preferred arrangement, the cable extends substantially in the same plane between the brake assemblies, at least in the brake released condition of the brake assemblies. In the brake applied condition, there may be some planar deviation, but that is likely to be very minor. Typically the opposite ends of the cable will be connected at the same point or location to the respective brake assemblies and it is only the point of extension from the rotatable member that will differ between the separate sections of the cable that extend to the brake assemblies. In the arrangement in which the rotatable member is of circular disc form, with a groove in the peripheral edge thereof, the cables will generally be arranged to extend from opposite sides of the disc and will be separated by a distance equal to about the base diameter of the groove. Thus the exit point of the cable sections from the rotatable member will be radially spaced and will be close to parallel.

The electric drive means may be operable to drive the rotatable member in each of the first and second directions, although it is equally appropriate for it to drive only in the first direction for cable retraction, as brake assemblies normally are biased to a brake released condition, so that the brake assembly would apply a load to the cable tending to rotate the rotatable member in the second direction in the absence of a driving force driving it in the first direction, or maintaining it against rotation in the second direction.

For proper operation of the parking brakes, sufficient cable pull or travel must be applied to the cables on each side of the actuator to properly actuate each brake assembly. Generally, the cable travel required will be equal for each cable, but under some circumstances, unequal travel will be necessary say for example, if the friction lining of one of the brake shoes of one of the brake assemblies has worn more than the brake shoe of the other brake assembly. It can also be necessary if there is cable stretch more on one side of the cable than the other or if the tolerance stack in the mechanism is greater in the brake assembly on one side of the actuator than the other, or if there is an imbalance in the initial adjustment of the brake shoe clearance.

In the above circumstances, equal cable travel will result in one of the pair of brake assemblies being applied to a lesser extent than the other, so that in extreme circumstances the parking brakes will not hold the vehicle stationary, because one of the wheels will not be properly braked.

The present invention is therefore concerned with a mounting arrangement for the actuator which facilitates equalization of the load applied to the brake assemblies, by permitting a difference in the cable travel applied to the cable on each side of the actuator.

An electric brake actuator assembly according to this aspect of the present invention includes an electric actuator which cooperates with a continuous cable that extends respectively to brake assemblies associated with the wheels of a vehicle and which is operable to pull the cables to apply the brake assemblies. The mounting arrangement is such as to permit movement of the actuator away from a second of the brake assemblies in circumstances when the cable pull applied by the actuator is operable to properly apply the first of the brake assemblies only and whereby away movement of the actuator applies further travel to the cable extending to the second brake assembly for proper application of that assembly.

Such shifting movement can facilitate proper application of each brake assembly, because without a shift, further rotation of the rotatable member will not be possible if one of the brake assemblies is properly applied, because the brake shoe of that assembly will have firmly engaged the braking surface and further rotation of the rotatable member requires further cable travel away from the brake assembly. But this will not be possible, because that would require further movement of the brake shoe. However, if the actuator shifts away from the second brake assembly and therefore toward the first brake assembly, the cable extending to the second brake assembly can be pulled further.

Additionally because the actuator shifts towards the first brake assembly, the rotatable member of the actuator will be able to further rotate to maintain the load in the cable extending to the first brake assembly and each of the shift and the further rotation can continue until sufficient cable travel has occurred for the second brake assembly to be properly applied. Thus, the cable extending to the second brake assembly is pulled a further distance by the displacement of the actuator, while the load on the cable of the first brake assembly is maintained by further rotation of the rotary member.

The mounting arrangement can be used with other forms of actuator. For example, the actuator may be one which is arranged for cooperation with a pair of separate cables connected to each of the brake assemblies and separately connected to the actuator. Other forms of electric actuator may be equally applicable.

In one form of the invention, the electric actuator is mounted for linear shifting movement, such as sliding movement, whereby the mounting arrangement includes a mounting arm or track on which the actuator is mounted for movement as required. In a further form of the invention, the electric actuator is mounted for pivoting movement, whereby the mounting arrangement includes an arm or a pair of spaced apart arms. In each arrangement, the arm or arms permits the electric actuator to swing in the event that shifting movement of the actuator is required. In the later arrangement, the arms preferably are substantially parallel and of equal length. The arm or arms further preferably extend substantially orthogonal to the direction of cable pull.

If a pair of arms are provided, they preferably are fixed to both the actuator and the vehicle rigidly, so that the arms flex to pivot when shifting movement of the actuator is required and the flexing movement is generally in the direction of cable pull. For this, the arms preferably flex in substantially one plane only and can therefore be formed substantially plate-like, so having a depth much greater than the width. In this arrangement, the arms are constructed to resist flexing other than in the direction of cable pull so that movement of the actuator is in the general direction of cable pull only.

The arms may be formed integrally with the actuator particularly if the actuator has a housing of molded plastic and the arms are molded depending from the housing. The arms could alternatively be separately connected to the actuator, and may for example, be formed of metal plate and fixed by suitable fixing means. The length of the arms can be arranged as suitable to mount the actuator to relevant support points of the vehicle. The length preferably is relatively short, say about equal to the depth, although it can be longer or shorter as required. In either case, the materials employed can be arranged for flexing as required.

The advantage of rigid fixing and flexing of the arms, is that the arms bias the actuator to return to its zero or datum point. Thus, no further biasing means are required. However, it is possible to employ arms which do not flex and to mount these for pivoting movement, say by hinge connections at each of the actuator and the vehicle, but suitable biasing means are then required to return the actuator to the zero or datum point.

Alternatively, a combination of hinged and flexing movement may be employed. This may be achieved by a flexible connection made by the arms with the actuator and by a hinged connection made by the arms and the vehicle support. In fact, if a pair of arms is employed, then only one of the four attachment points needs to be rigid to cause one of the arms to flex, and to therefore cause the above described return travel.

The shifting movement of the electric actuator in most cases is expected to be in the order of only several millimeters at most and in general, about 2 to 3 mm. In the mounting arrangement in which the arms pivot or flex, the actuator will move in an arc, but it will be appreciated that the small amount of movement involved will not result in a significant change in the angle of cables extending from the actuator, either directly to the brake assemblies or to the abutment of a cable conduit. Indeed the change in angle in most cases will be negligible.

It will be appreciated that the arms do not react any additional load if the cable travel of each of the cables is equal. In that circumstance, the actuator is not required to shift and the arms therefore are subject to normal loading, such as torque loading when the actuator applies a cable pull. The arms can be arranged to react in tension or compression to the normal torque loading, by the direction from which they extend from the actuator. For example, if the arms each extend in the same direction from the actuator, then the torque loading will result in one of the arms being in tension, while the other arm is in compression, depending on whether the torque loading is clockwise or anticlockwise. On the other hand, if the arms extend in opposite directions they will both be subject either to tensile or compressive loading depending on the direction of the torque loading.

The dimensions of the arms can vary to suit the application requirements. Also, the positioning and extension of the arms can also vary.

What is required however, is that the axes about which the arms pivot are required to be substantially parallel and the arms should extend substantially orthogonal to the direction of cable pull.

The electric actuator may alternatively be mounted on a single arm and that arm may be fixed to the vehicle and the actuator in a similar manner to that of the pair of arms discussed above. Thus, the arm maybe rigidly fixed to a support point of the vehicle and may extend therefrom to a rigid fixing to the actuator, so that movement of the actuator requires flexing of the arm. The arm may therefore be constructed to flex substantially in one plane only and accordingly can be formed plate-like, having a depth much greater than its width. The single arm may have characteristics similar to one of the pair of arms discussed above.

Alternatively, the single arm may be hingedly attached to either or both of the actuator and the vehicle support point. In one arrangement, one of the arm attachments is rigid and the other is hinged. In each case of use of a single arm, the points of attachment to the actuator and the vehicle support point must permit movement of the actuator as necessary in either direction of cable pull.

A single arm arrangement which is fixedly attached to the vehicle support point, will return to its zero or datum point upon return of the cables to a brake off or released condition. That is because the fixed attachment requires the arm to resiliently flex to permit movement of the actuator in the direction of cable pull. Advantageously, the return movement is automatic when the cable pull is released, so that additional means to facilitate return are not required. If each of the attachments is a hinged attachment, then biasing means of any suitable kind will be required.

A further alternative arrangement for mounting an electric actuator employs a pair of arms which extend from the actuator into connection with the vehicle, the connection being made along a single axis and the axis extending transverse to the direction of cable pull. The forms of attachment between the pair of arms, the actuator and the vehicle can be fixed or hinged as above described, with biasing means for returning the actuator to the zero or datum point being employed as necessary.

An assembly according to the invention is preferably operable to permit the brakes to be released in the event that the actuator fails, say by a power or component failure, or in an emergency when the brakes cannot be released.

This can be achieved in one of the above arrangements, in which the attachment to the vehicle is a hinged attachment, by removing the hinged post of the or each arm and thereafter manipulating the actuator relative to the cable or cables to release the cable tension sufficiently to release the brakes. This procedure can also be adopted if the attachment is rigid, but includes a pin or bolt or the like for rigid attachment.

In an emergency release situation the assembly preferably is arranged so that the actuator can be rotated (as opposed to rotation of the rotatable member) to partially relax the applied torque. This is because the stored energy in the brake application mechanism may cause the actuator to suddenly release, which may be dangerous to the person or persons involved, say for example if the hinged post on which the arm of the actuator is mounted is removed suddenly by force (it will not be easily removed). Rotation of the actuator will have the effect of reducing tension in the or each cable. With the cable tension reduced, the hinge posts or bolts may then be fully removed safely if further cable tension reduction is required.

The attached drawings show example embodiments of the invention of the foregoing kind. The particularity of those drawings and the associated description does not supersede the generality of the preceding broad description of the invention.

BRIEF DESCRIPTION OF THE DRAWING FIGURES

FIG. 1 illustrates a rear vehicle axle which includes an electric brake actuator according to the present invention.

FIG. 2 is an illustration of the electric brake actuator shown in FIG. 1.

FIG. 3 is an end view of part of the electric brake actuator as shown in FIGS. 1 and 2.

FIG. 4 is a cross-sectional view through IV—IV of FIG. 2.

FIG. 6 illustrates an alternative rotatable member of an electric brake actuator according to another embodiment of the invention.

FIG. 7 is an end view of the rotatable member shown in FIG. 6.

FIG. 8 shows a further embodiment of an electric brake actuator according to the invention.

FIGS. 11 to 15 illustrate different embodiments of mounting arrangements for mounting an electric brake actuator according to the invention.

DETAILED DESCRIPTION

Figure 5:
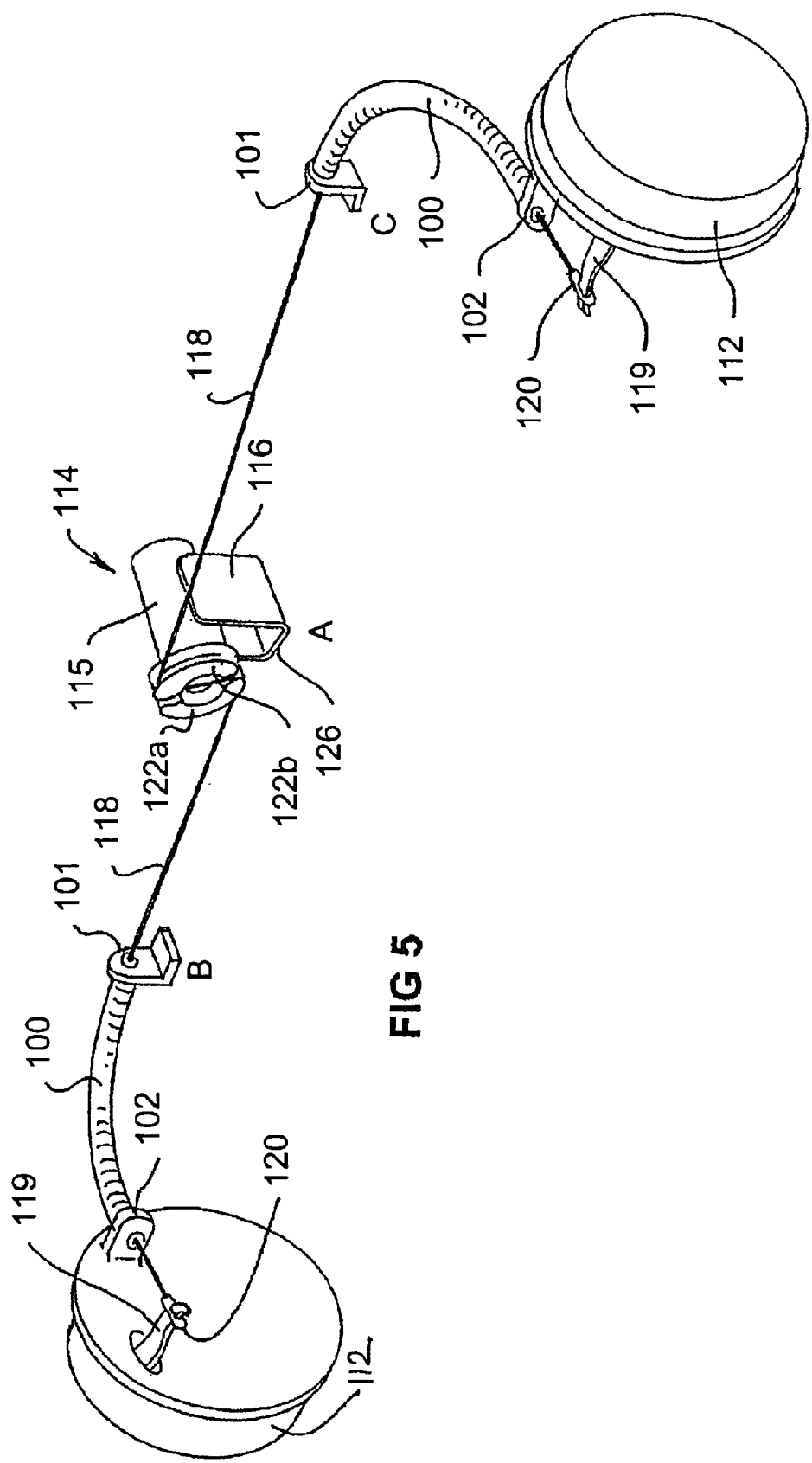
FIG. 5 illustrates a brake assembly arrangement which employs the electric brake actuator of FIGS. 1 to 4.

FIG. 1 illustrates a rear vehicle axle 10 which includes a differential 11 and a pair of wheel brake assemblies 12, disposed at each end of the axle 10 to which a vehicle wheel (not shown) can be mounted on the studs 13. As would be apparent to a person skilled in the art, this arrangement is a standard vehicle rear axle arrangement.

Mounted to the differential 11 is an electric brake actuator according to one aspect of the invention. The actuator 14 includes a housing 15 which includes a bracket 16 for mounting the actuator 14 to the differential 11 or the axial tube. The differential (or the axial tube) includes a platform 17 for the bracket 16 to be mounted to by any suitable means, such as by bolting.

A cable 18 extends between brake actuating levers 19 and is fixed to each by suitable links 20, which include an eye to accept and locate the ends of the levers 19. In the arrangement shown, the levers 19 are part of a parking brake system which apply the brake shoe or shoes of a drum brake against the drum braking surface of the drum brake.

The cable 18 extends about a rotatable member 21 of the actuator 14, which is configured to define a groove 23 to accommodate the cable 18 and further to define a particular cable path such that anticlockwise rotation of the rotatable member 21 is operable to retract the cable 18 extending from each side of the rotatable member 21 and to therefore apply a pull force through the cable 18 to each of the levers 19. Displacement of the levers 19 under the influence of the pull force will actuate the brake assemblies to apply a braking load on wheels attached to each of the wheel brake assemblies. Conversely, clockwise rotation of the rotatable member 21 will extend the cable 18 and will therefore release the pull force and result in removal of the braking load. As shown in FIGS. 1 to 4, the rotatable member 21 includes a pair of generally semicircular lobes 22a and 22b (referred to collectively as "the lobes 22") which extend axially away from a base 24 and which are spaced apart to define a passage or gap therebetween. The lobes 22 are shown in more detail in FIG. 2, and reference will now be made to that figure, in which like parts have the same reference numerals as in FIG. 1.

FIG. 2 shows the cable path and clearly shows the passage P between the lobes 22. The cable 18 as shown, follows a somewhat S or Z shaped path about the lobes 22 by extending from an upper end of the lobe 22b, through the passage P, to a lower end of the lobe 22a. FIG. 2 further shows the outwardly facing groove 23 formed on each of the lobes 22, the groove having a depth sufficient to prevent the cable 18 from sideways release therefrom in use. FIG. 2 further shows the bracket 16 in more detail and it is the case that the bracket 16 provides flexibility in the direction X, by way of flexible mounting plates 25. The mounting plates 25 allow for movement in the direction X, but are substantially inflexible to rotation about the axis Y.

Flexibility is desirable in the FIG. 2 embodiment, in relation to the action of cable equalization which is referred to later herein.

FIG. 2 also shows the mounting plate 26 and a pair of mounting bolts 27 for mounting the actuator 14 to the platform 17. An electrical lead 28 extends from the rear of the actuator 14.

FIG. 3 is an end view of FIG. 2 showing the lobes 22 and in broken line, the base of the groove 23 formed in the lobes 22 that accommodates the cable 18. The depth D of the groove is shown to be in excess of twice the diameter of the cable 18. The path of the cable 18 is also shown in this figure.

FIG. 3 illustrates the bearing surfaces which are the surfaces of engagement between the lobes 22, the groove 23 and the cable 18. The bearing surface is constituted by portions of the passage and groove surfaces and in the arrangement shown, as the rotatable member 21 rotates in an anticlockwise manner, the bearing surface will increase along the groove 23 provided on each of the lobes 22.

As shown in FIG. 3, the cable 18 extends from one bearing surface to the other, and away from each of the bearing surfaces for connection to separate brake assemblies.

FIG. 4 is a cross-sectional view of the actuator 14, through the axis Y of FIG. 2. As shown, the actuator 14 includes a housing 15 and a pair of lobes 22a and 22b. Each of the lobes 22 defines a groove 23 to accommodate the cable 18. The rotatable member 21 includes a base 24 and the lobes 22 are formed integrally with the base 24 and project axially outwardly therefrom.

The rotatable member 21 is fixed to an annular gear 29 by a plurality of threaded fasteners 30, only one of which is shown in FIG. 4.

Gear cluster 31 and 31a is disposed in meshing engagement with each of the annular gear 29 and the casing or outer ring gear 32. The gear cluster 31, 31a is mounted on an eccentric shaft 33 which is driven by an electric motor 34 (of which only the position is shown) through a coupling 35. The motor shaft 36 is supported in front and rear bearings 37 and 38. This arrangement can provide high reduction ratios.

Dust covers 39 and 40 are fitted at opposite ends of the actuator 14.

A manual override 41,42, concealed by the respective dust covers 39 and 40 is shown provided at each end of the actuator 14, although in practice, only one of these is required. The overrides 41 and 42 preferably are key operable, suitable say to receive an appropriate Allen key. The manual overrides are provided in the event that the actuator fails electrically and it is necessary to rotate the rotatable member 21 to apply or release the parking brake manually, or to release the cable 18 from the groove 23. The manual override 41 is operable to rotate the rotatable member 21 by rotating the eccentric shaft 33, while the manual override 42 is operable to rotate the motor shaft 36.

The actuator 14 further includes a bearing 43 between the outer surface of the annular gear 29 and the inner surface of the outer ring gear 32 and a further bearing (not shown) between the eccentric shaft 33 and the annular gear 29.

There are also counterweights applied to the eccentric shaft 33 which are not shown, but which are applied to minimize or eliminate out of balance rotation and to so improve smoothness of operation. A seal 44 is disposed between the annular gear 29 and the outer ring gear 32 to prevent the entry of foreign matter.

The arrangement shown in FIGS. 1 to 4 is operable such that rotation of the rotatable member 21 in an anti-clockwise manner will cause a pull force to be applied in opposite directions to the cable 18, on either side of the actuator 14. That pull force will act on each of the levers 19 to apply the parking brakes disposed respectively in the wheel brake assemblies 12. Rotation of the rotatable member 21 in a clockwise direction will release the applied pull force for release of the parking brakes.

The arrangement shown in FIGS. 1 to 4 provides several advantages.

One of the advantages is in the ease of assembly that the configuration of the rotatable member 21 affords. The rotatable member 21 permits a single or continuous cable to be employed and assembly is facilitated by disposing the rotatable member 21 so that the passage P extends lengthwise substantially horizontally. Disposed in that manner, the cable 18 can be joined at either end to the levers 19 and then inserted into the passage P. Thereafter, the electric motor 34 can be activated to rotate the rotatable member 21 anticlockwise, so that the cable 18 is captured in the groove 23 under tension.

The alternative method of assembly can comprise attaching one end of the cable 18 to one of the levers 19, threading the cable into the passage P, and thereafter attaching the other end of the cable to the other lever. Rotation of the rotatable member 21 can then be initiated as necessary to tension the cable ready for use. The actual method of assembly can be varied but still maintain ease of assembly.

A further advantage in the arrangement shown in FIGS. 1 to 4 is that it can permit some slipping movement of the cable relative to the lobes 22 and through the passage P, to provide for equalization of the load applied through the cable on either side of the actuator 14. Unequal loading may occur through stretching of the cable 18 on only one side of the actuator 14 or by unequal stretching. Alternatively, there can be unequal loading if the parking brakes fitted to the respective wheel brake assemblies 12 require different amounts of lever 19 movement to properly engage. Thus, by permitting the cable to slip relative to the rotatable member 21, the loading applied in either side of the rotatable member can be equalized and there can be some certainty that the pull force applied to the levers 19 is equal.

Equalization may also provide benefits in the event of a greater wearing or compression of the brake lining of one of the parking brake assemblies compared to the other. In this case, the more worn or compressed lining will require greater travel to engage the drum braking surface than the other lining.

Accordingly, the lever 19 operating with the worn or compressed lining will require a longer pull than the other lever. This can be achieved by slippage of the cable 18 when the less worn or compressed lining initially engages the drum braking surface, with the slippage continuing until the worn or compressed lining also engages the drum braking surface. The arrangement therefore is selfequalizing. This is particularly advantageous when the parking brake is used for the first time, because it can set the cable properly simply by rotation of the rotatable member to tension the cable. The cable will slip relative to the rotatable member 21 to bed in correctly. This is an advantage with a new vehicle, as well as older vehicles that may undergo brake maintenance, such as brake shoe replacement.

Any cable slippage will discontinue when an equal force is applied on either side of the rotatable member, or when an equal resistance from each lever 19 is met through the cable 18. Also slippage will discontinue if the frictional load between the cable and the groove exceeds the difference between the loads applied to the cable on either side of the actuator. In that case, the flexibility of the bracket 16 by the flexible mounting plates 25 (see FIG. 2) then permits a shift in the position of the actuator in either of the directions of cable extension, depending in which direction the greater load applies. Facility to shift is described in detail later, in relation to FIGS. 11 to 16.

FIG. 5 shows a further embodiment of the invention which employs the actuator 14 shown in FIGS. 1 to 4. Accordingly, like parts have been given the same reference numeral, plus 100. In the FIG. 5 embodiment, the cable 118 extends from either side of the actuator 114 and into a conduit 100. Each of the conduits 100 are fixed at either end to fixed brackets. Each of the brackets 101 is fixed to a vehicle mount (not shown) that is at the same planar position as the base 126 of the actuator bracket 116. Thus, each of the points A, B and C shown in FIG. 5 are the same ground and the cable 118 extending between points B and C is substantially coplanar.

The cable 118 enters the conduits 100 at each of the brackets 101 through an opening formed therein and extends through the conduit to exit through openings formed in the brackets 102, disposed at the other end of the conduits 100. As shown, the cable 118 extends to the parking brake levers 119 and engages those levers through links 120.

The FIG. 5 arrangement is an example of how the present invention can be modified to suit different parking brake assemblies. The FIG. 1 arrangement includes levers 19 that are displaced by the cable 18 toward the actuator 14, while in FIG. 5, the levers 119 are displaced at 90 to the FIG. 1 displacement. Thus, re-routing of the cable 118 through conduit 100 permits the invention to be employed regardless of the required direction of lever displacement.

The FIG. 1 embodiment employs a cable which is completely "bare", while the cable shown in FIG. 5 is partly bare and partly conduited. The completely bare arrangement is preferred, in terms of weight, efficiency and cost, although the cable layout will dictate whether full or part conduit is required. A bare cable is suitable if the cable path has a direct line of sight between the lever 19 and the rotatable member 21. If the line of sight is indirect, then conduiting is generally required.

FIG. 6 shows an alternative embodiment of a rotatable member 221 suitable for use in the present invention. The rotatable member 221 can be employed in place of the rotatable member 21 of FIGS. 1 to 5.

The rotatable member 221 is formed as a circular disc defining front and rear plates 222,223 and a groove 224. In this respect, the rotatable member 221 is formed like a pulley having a U-shaped groove 223. An opening 225 is formed to extend through the center of the member 221, to allow passage of the cable 218 and the cable link 220. FIG. 7 illustrates this arrangement whereby the rotatable member 221 is shown in plan view with the groove 223 and the opening 225 shown in broken line extending between diametrically opposed base portions of the groove 223.

The rotatable member 221 is operable in the same manner as the rotatable member 21, although it provides added security against the cable 218 being dislodged from the groove 223. It also is potentially more easily manufactured. The rotatable member 221 does require modified cable assembly, in that the cable 218 must be threaded through the opening 225, so that one of the possible assembly methods for the cable 18 and the rotatable member 21, that of connecting each end of the cable 18 to the levers 19 before applying the cable to the rotatable member 21, is not available with the rotatable member 221.

A particular advantage of the invention, available with either of the rotatable members 21 or 221, is that by virtue of a substantially constant groove radius R (see FIG. 3), a shift in the vertical position of the cables 18 and 218 (represented by VP in FIG. 3) upon rotation of the rotatable members 21 and 221, can be eliminated, or at least substantially eliminated. This is highly advantageous for the computer feedback systems employed in modern vehicles, which will control the amount of rotation of the rotatable member 21 to apply or release the required braking force. If there is movement in the vertical position of the cable during brake actuation, so called 3D movement, then the analysis required to be carried out by the computer becomes more complicated and therefore more prone to error. Also, as discussed earlier, the constant groove radius R advantageously means that a linear relationship exists between cable travel and the angular rotation of the electric drive motor shaft.

A further embodiment of the invention is shown in FIG. 8 and this shows an actuator 314 including a motor housing 315 and a rigid bracket 316 for mounting the actuator 314 to the differential or axial tube, or other suitable component of a vehicle. The actuator 314 includes a rotatable member 321 which is driven by an electric motor mounted within the housing 315. A geared drive arrangement of the kind shown in FIG. 4 may be employed for this purpose. The rotatable member 321 includes rollers 330 and 331. The rollers 330,331 are each formed like pulleys, so as to define a central groove 332 in the edge periphery thereof. The rollers 330,331 are each rotatably mounted to the rotatable member 321 on central spindles or axles 333.

A cable 318 extends from opposite sides of the actuator 314 and extends as shown about the upper external periphery of the roller 330, downwardly and about the lower external periphery of the roller 331.

The operation of the actuator 314 is similar to the embodiments described earlier, in that by rotation of the rotatable member 321 in a clockwise direction, the cable 318 will be retracted on each side of the actuator 314.

Conversely, rotation of the rotatable member 321 in an anticlockwise direction will extend the cable 318 on each side of the actuator 314. As described in relation to the earlier embodiment, this retracting and extending cable movement can be employed in a brake actuating assembly to apply and release vehicle brakes. However, the actuator 314 provides advantages in relation to cable equalization compared to the earlier described embodiments. In contrast to the earlier embodiment, the actuator 314 permits equalization without the need for a flexible bracket 16 of the kind described earlier in relation to FIG. 2.

In the FIG. 8 embodiment, the cable 318 does not meet the frictional resistance that the cable 18 experiences during relative sliding movement in the grooves 23 of the lobes 22, because the cable 318 does not slide relative to the rollers 330,331, but instead, the movement is relatively non-frictional rolling movement. Thus, the actuator 314 permits substantially complete equalization while employing a rigid mounting bracket.

The invention heretofore has been described principally in relation to two dimensional actuators, in which the cable passage through the rotatable member of the actuator 14 is substantially in a single plane. This is the case of the FIG. 1 arrangement, in which the cable 18 is dispersed along its full length substantially in the same vertically extending plane. In FIG. 5, the cable deviates from that plane when it enters the curved conduit 100 on either side of the actuator 114, however the cable 118 is nevertheless disposed substantially in a single vertical plane between the respective conduit brackets 101.

Figure 10:
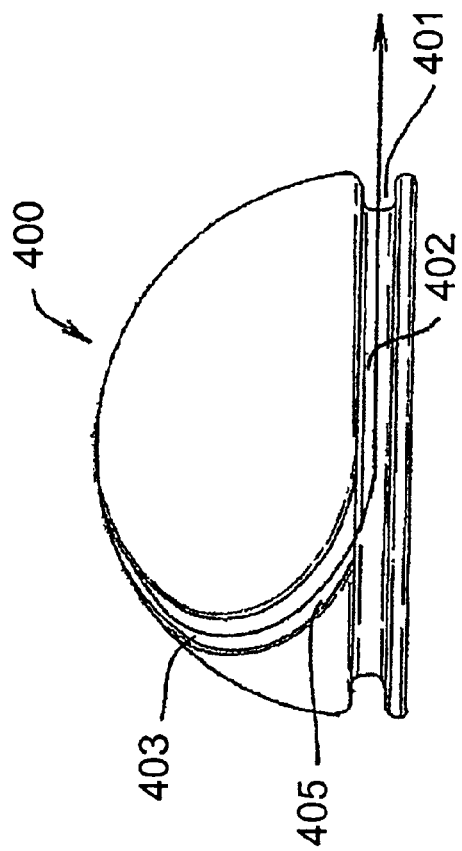
FIG. 10 is a side view of the rotatable member of FIG. 9.
Figure 9:
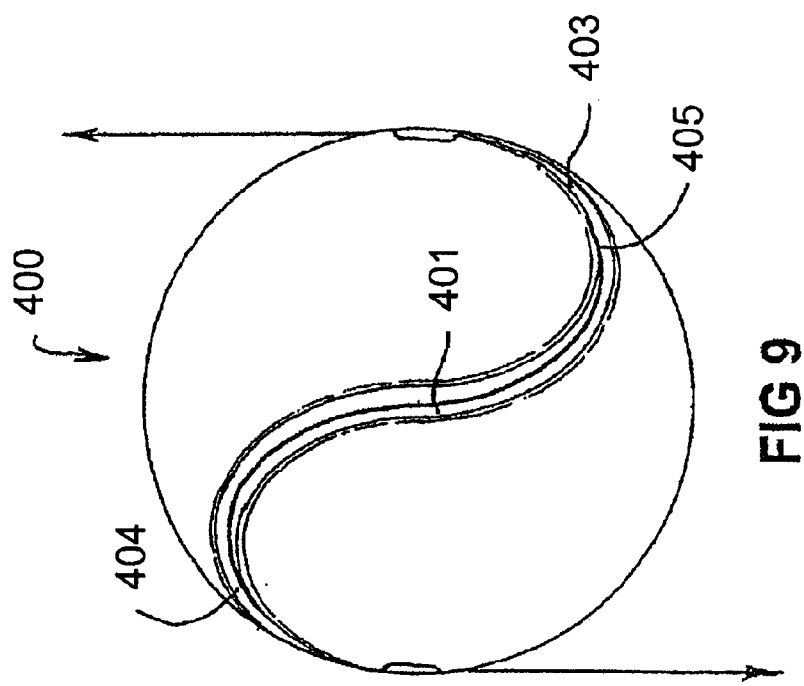
FIG. 9 is a further view of an alternative rotatable member according to a further embodiment of the invention.

The invention however is not limited to the two dimensional form of FIGS. 1 and 5, but can take three dimensional form such as that shown in FIGS. 9 and 10. FIG. 9 is a plan view of a rotatable member 400 which has a three dimensional form, while FIG. 10 is a side view of the same rotatable member 400. Each of FIGS. 9 and 10 show a cable passage 401 which consist respectively of an annular groove 402 and a curved groove 403. The curved groove 403 is formed into an "S" shape comprising a pair of joined, reverse curving semi-circular portions 404,405.

A cable 406 is shown in each of FIGS. 9 and 10 and it can be seen from FIG. 9, that the cable 406 extends in opposite directions from diametrically opposed sides of the actuator 400, like the rotatable members 21, 221 and 321 of the earlier figures. It will be appreciated therefore, that the rotatable member 400 operates to retract and extend the cable 406 in a similar manner to the earlier rotatable members described. Also, the rotatable member 400 can be driven by the same arrangements disclosed for driving the earlier described rotatable members.

Clearly, the annular and curved grooves 402 and 403 have a depth and configuration appropriate to maintain the cable 406 retained therewithin. For this, the groove shape of the rotatable member 400 may differ from the groove 23 of the rotatable member 21. In the rotatable member 21, the cable 18 is subject to substantially lengthwise loading only, so that the side walls of the groove 23 tend only to locate the cable 18 centrally of the groove. Otherwise, the cable 18 is not intended to bear against the side walls of the groove 23.

However, the three dimensional nature of the rotatable member 400, is such that the cable 406 bears under load against the inner side walls of each of the reverse curving portions 404 and 405. Thus, to ensure retention of the cable 406 within the groove 403, the inner side walls of the portions 404 and 405 can extend so as to form a retaining lip or the like, to resist release of the cable 406 from within the curved groove 403 when an actuator which includes the rotatable member 400, is operatively fitted to a vehicle. Such a retaining lip is not necessarily required to non-releasably fix the cable 406 within the groove 403, because one of the preferred forms of the invention requires the cable 406 to be easily inserted and released from that groove as explained before, for simple installation and maintenance purposes.

The actuator 400 provides an arrangement which permits an increase in the radius of curvature experienced by a cable engaged with the actuator. That is, the cable passage 401 permits a less aggressive change in cable direction through the rotatable member. This is because the cable experiences a relatively smooth transition from the annular groove 402 to the curved groove 403, on either side of the rotatable member 400. This smooth transition is relative to the equivalent transition of a two dimensional rotatable member, an example of which is shown clearly in FIG. 3. As shown in FIG. 3, on either side of the rotatable member 21, the cable 18 is shown extending horizontally, from each of the lobes 22a and 22b. The transition from the groove 23 to the passage P is shown as about an 80 change in cable direction at each of the engagement regions of the cable 18 with the lobes 22a and 22b. With the appropriate choice of cable, that angular transition will not affect the integrity of the cable, however, the more gentle transition that occurs with the three dimensional rotatable member 400, possibly permits a cable to be employed, that could otherwise not be employed with the rotatable member 21 of the FIG. 3. For example, the rotatable member 400 may permit a cable of larger gauge to be employed, which has the required strength characteristics, but which is less flexible than a cable of lighter gauge. Such a larger gauge cable may be subject to a permanent distortion if used in the rotatable member 21, but may not distort when applied to the rotatable member 400. A larger gauge cable may have the benefit of being less expensive than a cable of smaller gauge, as the smaller gauge cable may have to be formed from more expensive material to exhibit the same tensile strength characteristics of the larger gauge cable.

A three dimensional rotatable member also need not be hemispherical as in the rotatable member 400, nor is it required to have the cable grooves 402 and 403 as shown. The three dimensional shape of the rotatable member over which a cable extends may have any suitable shape and groove path.

Referring to FIG. 11, an electric brake actuator assembly 50 is shown.

The assembly 50 includes an electric drive motor 51 which drives a rotatable member 52. The motor 51 drives the rotatable member 52 through a gearbox which is disposed within a housing 53. The rotatable member 52 is of the kind discussed earlier, such as shown in FIGS. 1 to 5. The arrows A represent the direction of cable extent from the rotatable member 52 and it will be appreciated that the cable extends through the central channel 54 of the rotatable member 52 in an "S" or "Z" configuration.

The configuration of the rotatable member 52 is not intended to be restrictive on the assembly 50, although the invention has been developed with that particular configuration and the overall actuator in mind. The assembly 50 is equally applicable to electric actuators that connect to separate cables rather than a single continuous cable. For example, FIG. 11a shows an alternative rotatable member 52', that is rotatable about the axis Ax by suitable electric drive means, and which includes a pair of cables 59 separately connected to opposite ends of the member 52'.

Returning to FIG. 11, rotation of the rotatable member 52 in an anticlockwise direction applies a pull on the brake cable to apply each of the brake assemblies to which the cable is connected. Rotation of the rotatable member 52 in an opposite and clockwise direction, serves to unwind or relax the cable and thereby release the brake assemblies.

The arrangement of the assembly 50 relative to the brake cable and the brake assemblies, ideally is such that an equal cable pull will be applied to the cable sections extending in each direction from the rotatable member 52 and the cable travel caused by that pull will properly apply each brake assembly for secure braking of the vehicle. However, in circumstances described above, when one of the brake assemblies requires greater cable travel than the other, the assembly 50 includes flexible arms 55 and 56 which are formed integrally with the housing 53 but which extend substantially parallel to one another but in opposite directions and in planes substantially orthogonal to the direction A of cable pull.

The flexible arms 55 and 56 are operable to permit the rotatable member 52, the motor 51 and housing 53, to shift in the direction of cable pull, away from the brake assembly for which further cable travel is required for proper brake assembly application. As will be apparent from FIG. 11, the arms 55 and 56 have a depth D of a substantially greater dimension than the thickness T so that the arms can flex in the direction A of cable pull, but are largely constrained against flex in a transverse direction. This is important, because the assembly 50 is required to be firmly held, but with facility for shifting movement as described above. The arrangement shown in FIG. 11 achieves this, by only permitting shifting movement of the assembly 50 in the direction A, when uneven cable travel is required. In the absence of an uneven cable travel, the assembly 50 will maintain the rest or home position shown in FIG. 11, apart of course from vibrational movement that will occur during vehicle motion.

The arms 55 and 56 also include means for connecting the assembly 50 to support points on the vehicle and these comprise connecting tubes 57 and 58 which are arranged for receipt of a pin (not shown). The support points may for example be formed as part of the floor pan of the vehicle, or as part of the differential, or a combination of both. The pin connection preferably is rigid, so that the arms are caused to flex about the pin connection, rather than to hingedly pivot, although this latter arrangement could be employed if required.

The pin arrangement described above could alternatively take other forms and one or each of the arms 55 and 56 may terminate in a right-angle bend for fastener connection to a support point or for welding thereto. Thus, it will be appreciated that a variety of connecting means could be employed. For example, as an alternative to the pin arrangements shown, the arms 55 and 56 may have holes drilled through them (or otherwise provided) for receipt of bolts for fastening to the vehicle mounting point.

In the FIG. 11 embodiment, the arms 55 and 56 are each subject to compression loading on the basis of cable pull in the direction A. Each arm would be subject to tensile loading if the rotatable member was rotated in the reverse direction with the cable threaded through the rotatable member opposite to what is shown. An alternative arrangement is shown in FIG. 12, in which like parts of FIG. 11 are given the same reference numerals, plus 100. In FIG. 12, the assembly 150 includes a pair of arms 155 and 156. The arms 155 and 156 are constructed substantially of the same dimensions as that of the arms 55 and 56 of FIG. 11, but they extend substantially in the same direction and in substantially parallel planes. As is apparent in FIG. 12, the arms 155 and 156 are disposed on either side of the motor 151 and include tubes 157 and 158 for pin connection to a vehicle support in the same manner as the assembly 150 of FIG. 1.

Like the FIG. 1 arrangement, the arms 155 and 156 are arranged for flexing in the direction A of cable pull, in the event that unequal cable travel is required. Also, the loading of the arms 155 and 156 differ from the arms of FIG. 11, in that the arm 155 is subject to compression loading, while the arm 156 is subject to tensile loading. The FIG. 12 arrangement is illustrative of how the arms of the assembly can be disposed in different directions and still achieve the required flexing movement when required. The assembly 150 may be employed in vehicles in which the assembly 50 of FIG. 11 is inappropriate due to different construction.

Referring to FIG. 13, an assembly 160 is shown and again, like parts from FIG. 1 are given the same reference numeral, but in this Figure, plus 110. This FIG. 13 arrangement shows still a further alternative mounting arrangement, which employs the twin arm arrangement of FIGS. 11 and 12, but in a different relative configuration. In the FIG. 13 embodiment, a pair of arms 165 and 166 is provided and each arm extends in the same direction and generally parallel, and generally orthogonal to the direction of cable pull. As with the previous embodiments, the arms 165 and 166 permit shifting movement of the assembly 160 in the direction of cable pull when uneven cable travel is required. In this arrangement, the arm 165 is in compression and the arm 166 in tension.

As is apparent from each of FIGS. 11 to 13, the respective arms are formed integrally with the respective gearbox housings. This is particularly appropriate for molded arrangements, but it is equally possible for the arms to be formed as a bracket. In FIG. 12, the arms 155 and 156 may be separately formed and be connected to a web 159, and the bracket so formed comprising the arms and web, is sandwiched between the motor 151 and the gearbox housing 153. Other arrangements could be equally possible.

Figure 14:
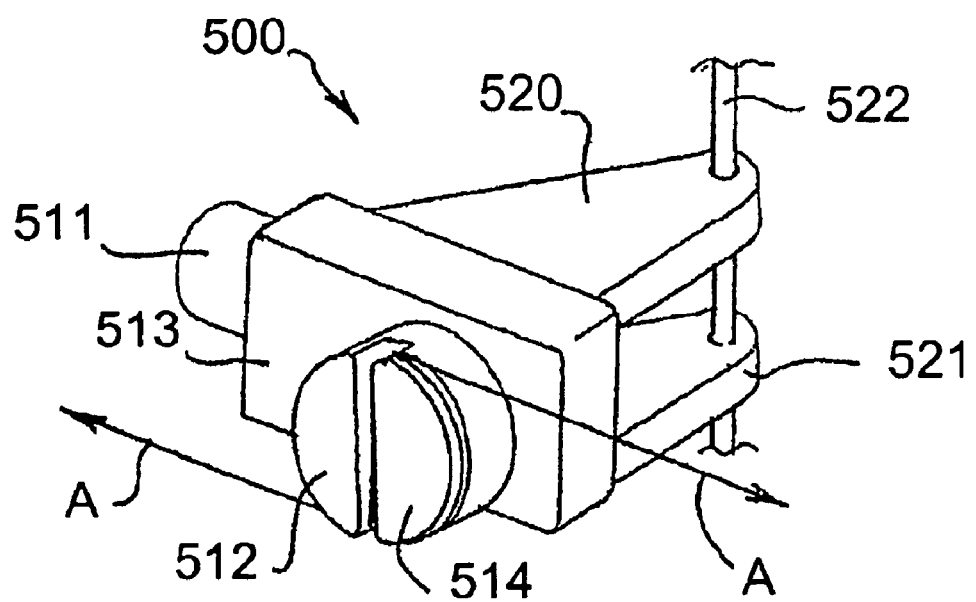
Figure 15:
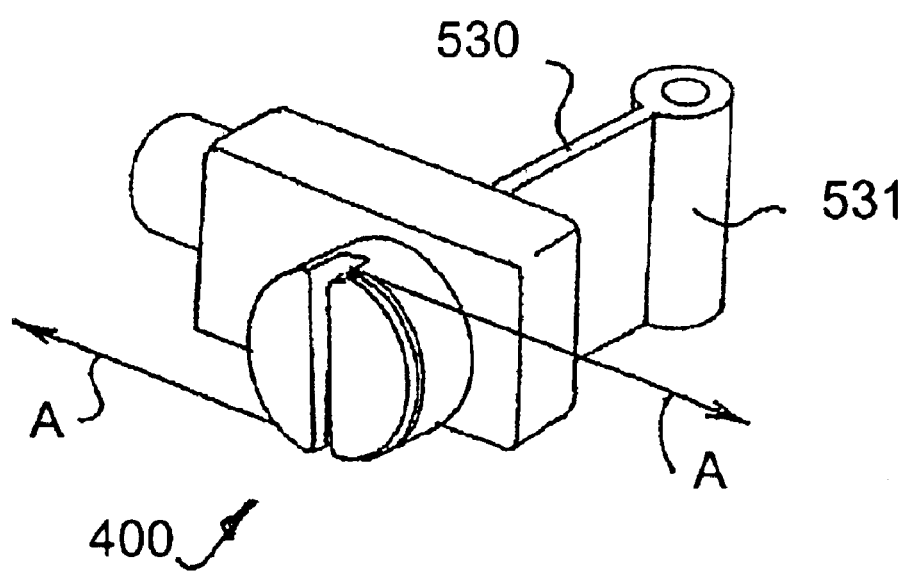

FIGS. 14 and 15 show alternative embodiments of the invention.

Referring to FIG. 14, an assembly 500 is shown including a motor 511, a rotatable member 512 and a housing 513. The rotatable member 512 is of a similar form to the rotatable members of FIGS. 11 to 13 and includes a channel 514 and cable which extends through the channel 514 and in opposite directions as indicated by the cable arrows A.

The mounting arrangement of the assembly 500 includes a pair of arms 520 and 521, which are disposed at 90 to the arms shown in FIGS. 11 to 13 and which extend from the actuator for mounting about a common axis defined by a post 522. The actuator assembly therefore can be displaced about the axis of the post 522 as required when unequal cable pull is necessary.

It will be appreciated that in the Figure embodiment, the arms 520 and 521 are not arranged for flexing in the direction of cable pull. Also, the arms have a thickness so as to substantially prevent flexing in the broad plane thereof, as such flexing movement in that plane is not desirable.

The arms 520 and 521 may be fixed against axial movement relative to the post 522, such as by a step support in the post, or by circlip support, or by other suitable means. The arms however are permitted rotational movement about the post 522 for relevant actuator movement.

Referring to FIG. 15, an assembly 530 is shown including an electric actuator of the same kind shown in FIG. 14. The mounting arrangement for the assembly 530 includes a single arm 531, which is fixed at one end to the electric actuator and at the other end is formed as a tube 531 for fixing to a vehicle support point in the same manner as the arms of FIGS. 11 to 13. The arm 530 is arranged for flexing in the direction of cable pull to allow the actuator movement as required. In this embodiment, the arm can be fixed rigidly at each end to the actuator and the vehicle support point, or it can be hingedly fixed at each end. Alternatively, one end may be hinged and the other rigidly fixed.

In applications in which flexibility is required, grooves, parallel to the axis of the tube 531 may be applied to the arm 530. Any number of grooves may be applied depending on the stiffness of the arm 530 and the required degree of flexibility. In a preferred arrangement, grooves are applied to each side of the arm directly opposite each other. Despite the application of grooves, the arm 530 is still required to have sufficient torsional rigidity to resist cable torque.

Figure 16:
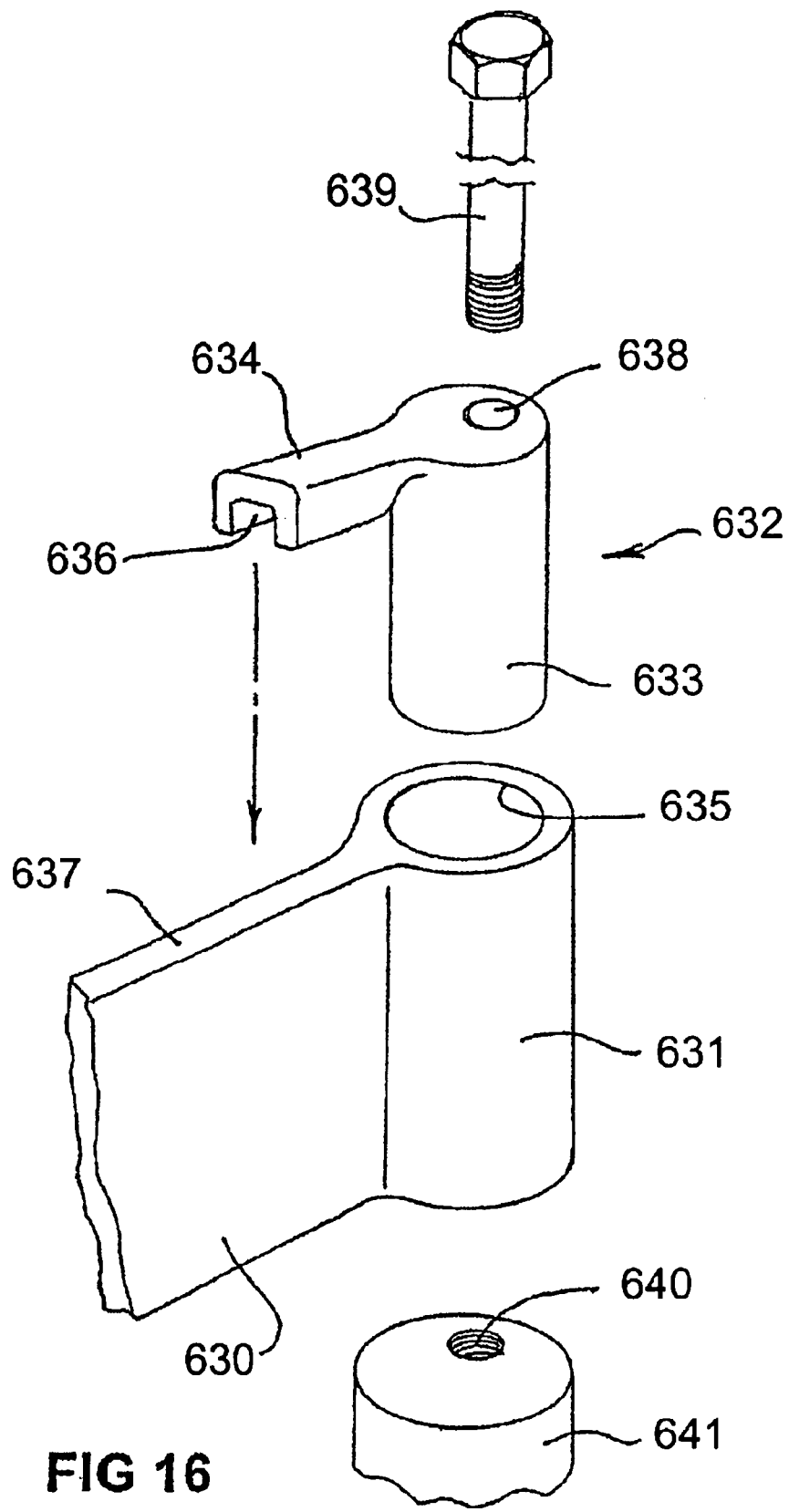
FIG. 16 illustrates a particular fixing arrangement according to one embodiment of the mounting arrangements of the invention.

FIG. 16 shows an arrangement which permits controlled return movement of the actuator from a loaded position to release stored energy.

Controlled return is desirable in the event that the electric actuator assembly fails and must be released, because without controlled release in those circumstances, there may be a sudden release of the cable tension, which could be dangerous to the personnel involved.

The arrangement of FIG. 16 shows one end section of a typical arm 630 of the kind depicted in FIGS. 11 to 13 and 15, having a tube end 631 for part 633, and a transverse lever 634. The bush part 633 is received within the opening 635 of the tube 631, while the lever 634 is formed with an inverted channel 636 to engage about the upper edge 637 of the arm 630.

The bush part 633 includes an eccentric opening 638 for receipt of a bolt 639. In an assembled condition, the bolt extends through the eccentric opening 638 for threaded engagement in the eccentric opening 640 of the vehicle support point 641. The arrangement is such that, with the arm 630 in a flexed condition and the electric actuator having failed in a brake on condition, the bolt 639 can be slightly loosened to lift the lever 634 from channel engagement with the upper edge 637 of the arm 630, and the bush 632 can be rotated by the lever 634 about its eccentric axis. The tube 631 and the arm 630 will move eccentrically with the bush 632 to shift the actuator in a direction so as to relieve some or all of the stored energy in the flexed arm and to reduce cable tension.

The or each bolt (depending on the number of arms employed) can then be removed fully for complete removal of the actuator under safer conditions. In general, the eccentric bush 622 should be turned in a direction that increases the effective length of an arm 630 under tension, or reduces the effective length of an arm 630 under compression.

It is to be appreciated that the eccentric bush 622 arrangement can be applied, if desirable, at each end of the arm 630. By providing the arrangement at each end of the arm 630, there can be a greater shift of the actuator for increasing the reduction in cable tension.

Each of the arrangements of FIGS. 11 to 16 lend themselves to electronic monitoring of actuation characteristics. Micro switches can for example, be fitted to the arms of the respective arrangements to monitor the amount of shifting movement the assemblies undergo. Excessive shifting movement may indicate wear of the brake shoes, or deterioration of other parts of the overall braking system. The electric nature of the assembly can be used to send an alert signal to the driver, so that the driver can take remedial steps as required.

The invention described herein is susceptible to variations, modifications and/or additions other than those specifically described and it is to be understood that the invention includes all such variations, modifications and/or additions which fall within the spirit and scope of the above description.

Having described the invention, what is claimed is:

1. An electric brake actuator, including a rotatable member and electric drive means for driving said rotatable member to rotate about an axis fixed relative to the drive means, said rotatable member being arranged in engagement with a continuous cable that in use extends between and in connection with a pair of brake assemblies that are operable when actuated to apply a braking load to brake a wheel associated with each respective said brake assembly, said rotatable member being arranged such that it is operable to pull said cable on each side of said rotatable member upon rotation of said rotatable member in a first direction, for actuation of said brake assemblies, and to extend said cable on each side of said rotatable member upon rotation of said rotatable member in a second and reverse direction.

2. An electric brake actuator according to claim 1, said rotatable member including a pair of spaced apart bearing surfaces for bearing engagement by said cable and positioned so that the cable can extend from one said bearing surface to the other said bearing surface and away from each said bearing surface for extension respectively to said pair of brake assemblies.

3. An electric brake actuator according to claim 2, said pair of bearing surfaces being spaced apart symmetrically on opposite sides of the axis about which said rotatable member is driven to rotate.

4. An electric brake actuator according to claim 2, said bearing surfaces being curved.

5. An electric brake actuator according to claim 4, said bearing surfaces being curved at a constant and equal radius.

6. An electric brake actuator according to claim 1, said rotatable member being formed as a circular disc with a cable groove formed in the peripheral edge of the disc and being open radially, and with a passage formed through the disc and which opens at either end into the base of the groove, said cable extending through the passage and into the cable groove at each end thereof.

7. An electric brake actuator according to claim 6, said passage being formed to extend diametrically through the rotational axis of the disc.

8. An electric brake actuator according to claim 6, said passage being formed as a bore.

9. An electric brake actuator according to claim 6, said passage being open and extending between or separating two sections of the rotatable member.

10. An electric brake actuator according to claim 1, said rotatable member including a pair of rollers rotatably mounted to a back plate, each of said rollers defining a cable bearing surface and said cable extending from one of said rollers to the other for extension respectively to said pair of brake assemblies.

11. An electric brake actuator according to claim 10, each of said rollers defining an annular groove for receipt of said cable therein.

12. An electric brake actuator according to claim 1, said rotatable member defining a three dimensional surface for engagement with said cable.

13. An electric brake actuator according to claim 12, said three dimensional surface defining a cable groove for receipt of said cable.

14. An electric brake actuator according to claim 13, said cable groove including a pair of joined, relatively reverse curving portions, each presenting a bearing surface on opposite sides of said groove for bearing engagement with said cable.

15. An electric brake actuator according to claim 14, said cable groove portions being generally semi-circular in lengthwise shape.

16. An electric brake actuator according to claim 12, said three dimensional surface being generally hemi-spherical.

17. An electric brake actuator according to claim 14, said rotatable member being formed as a circular disc with a cable groove formed in the peripheral edge of the disc and being open radially, and said three dimensional surface extending axially therefrom, said cable groove of said three dimensional surface intersecting at each end thereof with said peripheral edge cable groove, said intersection facilitating passage of said cable from said peripheral edge cable groove to said three dimensional surface cable groove at each end of said three dimensional surface cable groove.

18. An electric brake actuator according to claim 1, including mounting means for mounting said actuator to a vehicle said mounting means permitting said actuator to shift in the direction of cable pull.

19. An electric brake actuator according to claim 18, said mounting means including a pair of spaced apart, substantially parallel plates which are connected at opposite ends to said actuator and said vehicle respectively so that the broad plane of each plate faces generally in the direction of cable pull.

20. An electric brake actuator according to claim 19, at least one of said plates being rigidly fixed to at least one of said actuator and said vehicle and being flexible in the direction of cable pull.

21. An electric brake actuator according to claim 19, at least one of said plates being hingedly connected to at least one of said actuator and said vehicle and being pivotable in the direction of cable pull.

22. An electric brake actuator according to claim 19, including biasing means for biasing said plates to return said actuator from a shifted condition.

23. An electric brake actuator according to claim 19, said plates extending in opposite directions from said actuator.

24. An electric brake actuator according to claim 19, said plates extending in the same direction from said actuator.

25. An electric brake actuator according to claim 18, said mounting means including a pair of spaced apart, substantially parallel arms, which are connected at opposite ends to said actuator and said vehicle respectively, said connection to at least one of said actuator and said vehicle being made along substantially a single axis which extends transverse to the direction of cable pull.

26. An electric brake actuator according to claim 25, at least one of said arms being rigidly fixed to at least one of said actuator and said vehicle, and being flexible in the direction of cable pull.

27. An electric brake actuator according to claim 25, at least one of said arms being hingedly connected to at least one of said actuator and said vehicle, and being pivotable about said single axis.

28. An electric brake actuator according to claim 25, including biasing means for biasing said arms to return said actuator from a shifted condition.

29. An electric brake actuator according to claim 18, said mounting means including a single arm connected at opposite ends to said actuator and said vehicle, said connection to at least one of said actuator and said vehicle being rigid and said arm being flexible in the direction of cable pull.

30. An electric brake actuator according to claim 18, said mounting means including a single arm connected at opposite ends to said actuator and said vehicle, said connection to at least one of said actuator and said vehicle being hinged and said arm being pivotable in the direction of cable pull.

31. An electric brake actuator according to claim 18, said mounting means including at least one arm, connected at opposite ends to said actuator and said vehicle respectively, at least one of said connections being a hinged connection, said hinged connection including a post about which said arm is hinged, said post being shiftable to facilitate manipulation of said actuator to relieve cable tension.

32. An electric brake actuator according to claim 31, said manipulation comprising rotation of said actuator.

33. An electric brake actuator according to claim 31, said post being received in an opening eccentrically formed in a bush and said bush being received in an opening formed in an end of said arm, each of said openings being parallel axially, said post being fixed at each of opposite ends thereof relative to said arm to hingedly secure said arm to at least one said actuator and said vehicle, said bush being rotatable to shift said eccentric opening and said arm to facilitate cable tension reduction.

34. An electric brake actuator according to claim 33, said bush including a locking lever formed as a channel to accept an upper edge of said arm and so to prevent rotation of said bush, said lever being liftable to lift said channel from said upper edge, to facilitate rotation of said bush.

35. An electric brake actuator according to claim 34, said lever being liftable upon shifting said bolt in the lifting direction of said lever.

36. A vehicle brake system including a pair of brake assemblies respectively associated with a pair of wheels of a vehicle, a cable extending between said pair of brake assemblies and in engagement with an electric brake actuator according to any one of the preceding claims, said actuator being operable by rotation of said rotatable member thereof to pull said cable on either side thereof to apply each of said pair of brake assemblies and thereafter to extend said cable to release said brake assemblies.

* * * * *